United States Patent [19]

Arnberg

[11] Patent Number: 4,685,806

[45] Date of Patent: Aug. 11, 1987

[54] LASER PLANE APPARATUS FOR MEASURING CHARACTERISTICS OF TRAFFIC-BEARING SURFACES

[76] Inventor: Peter W. Arnberg, Odeng 75 IV, 11322 Stockholm, Sweden

[21] Appl. No.: 739,543

[22] Filed: May 30, 1985

[30] Foreign Application Priority Data

May 30, 1984 [SE] Sweden ................................. 8402952

[51] Int. Cl.⁴ .......................................... G01B 11/24
[52] U.S. Cl. ...................................... 356/376; 73/105; 73/146; 356/371; 356/400
[58] Field of Search ..................... 356/371, 376, 400; 73/105, 146; 358/107

[56] References Cited

U.S. PATENT DOCUMENTS

| | | | |
|---|---|---|---|
| 3,462,845 | 8/1969 | Matthews | 33/46 |
| 3,637,309 | 1/1972 | Hosterman | 356/172 |
| 3,890,840 | 6/1975 | Malloy | 73/290 V |
| 4,473,319 | 9/1984 | Spangler | 73/146 X |
| 4,535,699 | 8/1985 | Bühler | 73/146 |

FOREIGN PATENT DOCUMENTS

| | | | |
|---|---|---|---|
| 0017106 | 1/1984 | Japan | 356/371 |
| 0027247 | 2/1984 | Japan | 356/371 |

OTHER PUBLICATIONS

Cantor, *SPIE*, vol. 178, Smart Sensors, 1979, pp. 127–135.

*Primary Examiner*—F. L. Evans
*Attorney, Agent, or Firm*—William J. Bohler

[57] ABSTRACT

A mobile system for measuring characteristics of traffic-bearing surfaces has laser cameras mounted on a vehicle for measuring the distance to the surface as the vehicle travels along it. A rotating laser at a known, fixed elevation generates a laser plane over the surface while a second oscillating or rotating laser generates a substantially vertical laser plane in the direction of measurement of the surface. The vehicle carries a pair of sensors for detecting the incidence of the laser planes thereon. The sensors generate signals which represent the exact vertical and lateral position of the vehicle with reference to the fixed laser planes at any point on the surface. These signals are used to obtain values representative of the vertical elevation of the surface compensated for deviations in the vertical position of the vehicle during the measurement, and to record and control the measuring path of the vehicle.

14 Claims, 3 Drawing Figures

LASER PLANE APPARATUS FOR MEASURING CHARACTERISTICS OF TRAFFIC-BEARING SURFACES

BACKGROUND OF THE INVENTION

The present invention relates generally to systems for measuring the surface characteristics of traffic-bearing surfaces such as highways, roads, and airport runways. In particular, the present invention relates to a non-contact measuring system which accurately measures the characteristics of a surface over which it travels with reference to known, fixed, laser-generated reference planes.

Traffic-bearing surfaces such as highways, roads, and airport runways are subjected to wear from many sources including salt, studded tires, excessive weight, and friction, to name but a few. In addition, such surfaces may be subjected to settling or shifting of the underlying material, extreme temperature and weather variations, and other damaging effects. As a result, such surfaces often develop ruts, cracks, roughness, unevenness and other irregularities.

It is desirable to be able to quickly and accurately measure the characteristics of such surfaces in order to determine when, where, and to what extent the need for surface repair is indicated. Such measurements are also beneficial in determining whether newly laid surfaces correspond to specifications and guarantees, for example. It is also desirable to be able to perform such measurements on substantially the same surface locations at different times. By repeating measurements at the same locations on a surface, over a period of time, an indication of surface wear with respect to time is obtained. This information is most helpful, for example, in determining what types of surface materials to employ in various locations and for various uses.

Various systems are known for measuring the characteristics of road surfaces. However, these prior art systems suffer from various drawbacks which limit their usefulness.

For example, it is known to use conventional geodetic analysis, and to proceed from a plurality of points having known, fixed coordinates to obtain the coordinates of points on a traffic-bearing surface, and thereby determine the surface characteristics. However, this approach requires the surveying of a very large number of points, perhaps in the thousands, on the surface of interest. It is, therefore, a very time consuming and costly approach, especially where the surfaces to be measured extend for hundreds of miles.

Mobile measurement systems are also known. These generally involve propelling a measurement device along the surface being measuring. The measurement device itself may or may not directly contact the surface. Prior art mobile measurement systems generally have been able to overcome problems associated with the conventional geodetic approach.

For example, U.S. Pat. No. 3,266,302 issued Aug. 16, 1966 to Spangler discloses a mobile system for quickly measuring road surface irregularities using an accelerometer to measure the vertical acceleration of the sprung chassis of the measuring vehicle and an integrator to calculate vertical displacement of the road surface therefrom. A potentiometer attached to the sprung portion of the vehicle generates signals representative of vertical movement of the sprung portion.

U.S. Pat. No. 4,422,322 issued Dec. 27, 1983 to Spangler discloses an improvement on the '302 system wherein the road surface measurements are taken independent of changes in the horizontal velocity of the measuring vehicle. Vertical acceleration of the sprung chassis of the vehicle is still relied on as a value representative of the vertical displacement of the road surface.

However, propelling a measurement device along a surface being measured generates additional problems which have yet to be adequately solved in the known systems. When, as in the known systems, a vehicle having a sprung suspension carries the measuring device along the surface being measured, irregularities in the surface encountered by the wheels of the vehicle cause vibrations in the vehicle and vertical movements of the vehicle's sprung suspension due to compression and expansion of the vehicle's springs. These vertical movements cause the measured surface values to be inaccurate. This inherent inaccuracy is not eliminated by measuring the deviation in the vertical position of the sprung portion of the vehicle chassis with respect to another point on the same chassis because that point experiences similar vertical deviations. In addition, with known systems, there is no accurate way to determine that subsequent measurements of the same surface performed at a later time are made on substantially the same surface locations, or to register any deviation therefrom.

One approach to compensating for vertical deviations in the position of a measuring vessel in the field of oceanography has been to establish a horizontal laser reference plane. U.S. Pat. No. 3,890,840 issued June 24, 1975 to Malloy, discloses an underwater depth measuring system which employs a horizontal laser plane generated by a land-based laser as a vertical reference point for a ship carrying an underwater depth transducer. As the vertical position of the ship varies with respect to the reference plane due to surface disturbances, the signal from the underwater depth transducer is correspondingly adjusted. This system, however, does not address the problem of how to accurately perform subsequent measurements on the same surface at a later time at substantially the same locations as were previously measured. Nor does it address the problem of how to accurately maintain the vessel on a selected measurement path.

SUMMARY OF THE INVENTION

The present invention overcomes the inherent inaccuracies present in surface measurements made by prior art mobile surface measuring systems. At the same time, the present invention provides a system that accurately guides the measuring vehicle along a selected measurement path, and accurately performs subsequent measurements on a surface at substantially the same locations as were previously measured, or that measures and records any deviation therefrom.

These advantages are achieved in the present invention by providing a mobile measuring system comprising two or more lasers for establishing vertical and horizontal reference planes with respect to known, fixed points, and a vehicle which carries non-contact surface measuring equipment, and sensors for sensing the point of incidence of the laser planes therewith. Processing, recording, and storage equipment is also provided for receiving, processing, recording, and storing signals generated by the sensors and the surface measuring equipment.

By determining the points of incidence of the reference planes on the sensors, both the vertical and the horizontal position of the vehicle with respect to fixed references are known at any point. Any vertical or horizontal deviations in the position of the vehicle with respect to the references can then be corrected or compensated for. Thus, the values measured by the surface measuring equipment can be compensated for deviations in the vertical position of the vehicle, and lateral deviations of the vehicle from a selected measurement path can be corrected.

The novel features believed to be characteristic of the present invention are set forth in the appended claims. The invention itself, together with these and further objects and attendant advantages, will best be understood by reference to the following description, which, when taken in conjunction with the accompanying drawings, discloses a presently preferred embodiment of the invention.

DETAILED DESCRIPTION OF A PRESENTLY PREFERRED EMBODIMENT

Figure 1:
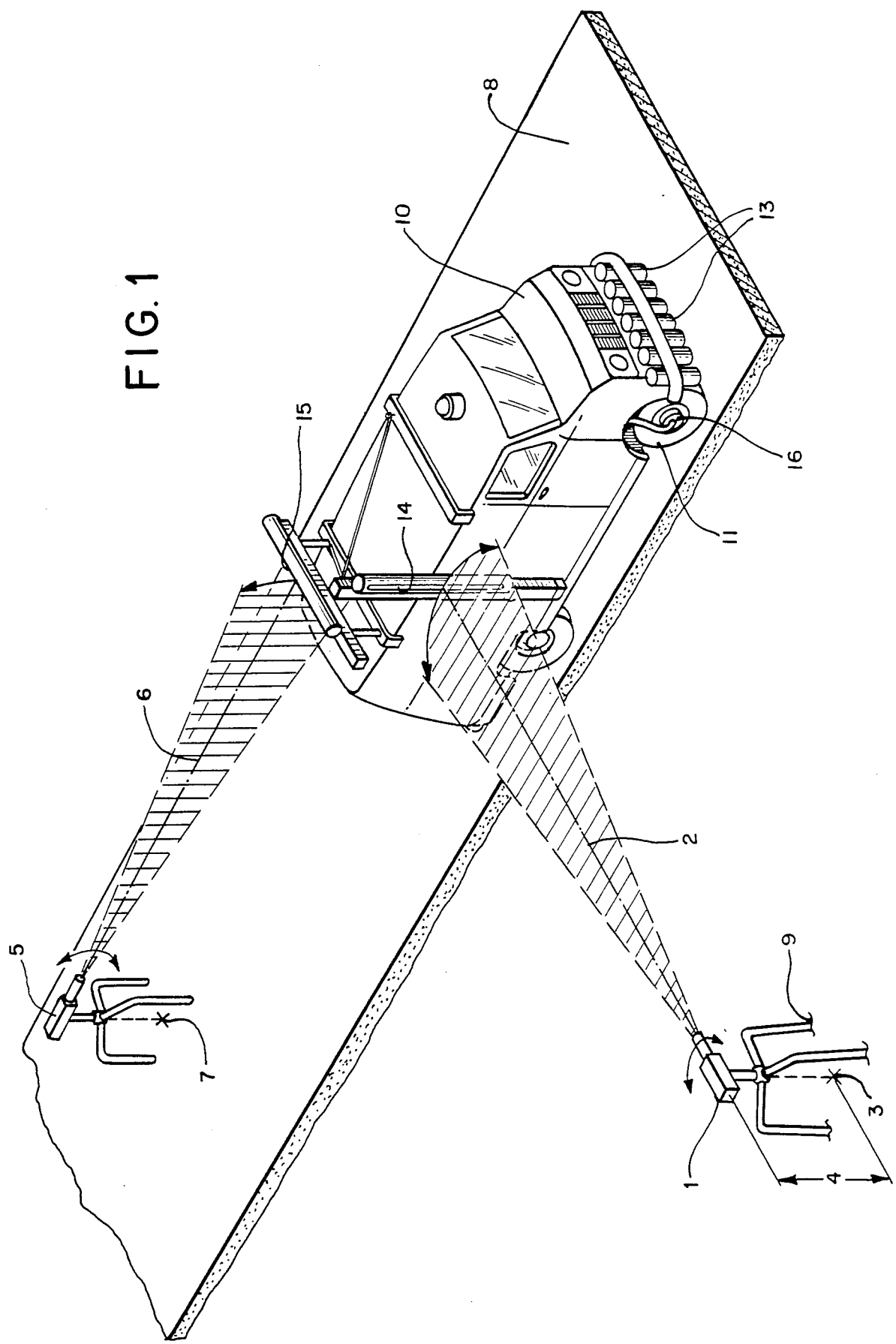
FIG. 1 is a perspective view of a presently preferred embodiment of the surface measuring system of the present invention.

Referring to FIG. 1, a first laser 1 is located alongside a stretch of surface 8 to be measured. The first laser 1 is positioned at a known elevation 4 above an arbitrarily chosen fixed point 3 on the ground 9. The first laser 1 generates a laser beam, and rotates or oscillates by means of a motor, for example, to generate a laser plane 2 which extends over surface 8. The laser plane 2 is preferably substantially horizontal but may be at a known fixed angle from horizontal if necessary or desired. The fixed point 3 can be chosen to lie, for example, some 100 meters from the edge of a road or runway surface to be measured, and is preferably located near the midpoint of the surface to be measured. Alternatively, a plurality of rotating or oscillating lasers 1 can be positioned along the surface 8 to be measured. For example, lasers 1 could be positioned near the middle and both ends of a longitudinal surface 8 to be measured. In this case, the elevations 4 of the lasers 1 can be chosen so that the substantially horizontal laser planes 2 coincide, or so that the elevations of the laser planes 2 differ by a known amount.

A second laser 5 is located at an end of the surface 8 to be measured. The second laser 5 is positioned at an arbitrarily chosen fixed point 7 which may be on or off the surface 8 to be measured. The second laser 5 generates a laser beam, and rotates or oscillates by means of a motor, for example, to generate a substantially vertical laser plane 6 which extends along the surface 8 in the direction of measurement. Alternatively, a plurality of second lasers 5 can be positioned extending transversely across one or both ends of the surface 8 to be measured. In this manner, a plurality of substantially vertical parallel laser planes 6 is established in the longitudinal direction of the surface 8 to be measured.

A vehicle 10 having a sprung suspension carries the surface measuring equipment 13 along the surface 8 to be measured. The surface measuring equipment 13 preferably consists of one or more conventional laser transducers, such as those manufactured by Selcom, or Phillips, for instance. However, other known measuring devices such as ultrasound transceivers, Doppler shift frequency transceivers, infrared light transceivers, or the like could also be used. Such surface measuring equipment 13 for measuring the vertical distance to the surface 8 as the vehicle 10 travels along it is well known to those skilled in the art and requires no further discussion here. The transducers and/or transceivers comprising the surface measuring equipment 13 are preferably mounted in a predetermined spaced relationship in a row extending transversely to the longitudinal direction of the surface 8 to be measured. They may be mounted, for example, on a rack outside the vehicle 10 in the location of the front bumper. Each transducer or transceiver measures a track of the surface 8 as the vehicle 10 proceeds. As an example, thirteen 13 laser cameras could be mounted on a three meter rack to measure thirteen surface tracks in a three meter wide sweep. The surface measuring equipment 13 also preferably includes an inclinometer (not shown) for measuring the transverse slope of the surface 8.

The vehicle 10 also carries a first and a second sensing body 14, 15. Each sensing body 14, 15 detects the incidence of laser light at any point along its length, and generates a signal representative of the point of incidence of the light. The first sensing body 14 is positioned vertically on a side of the vehicle 10 using wires and/or other conventional fastening apparatus. The second sensing body 15 is mounted in similar fashion horizontally atop the vehicle 10. The first and second sensing bodies 14,15 preferably comprise photocell arrays movable along the vertical or horizontal axis respectively in a light-passing housing. Each photocell array automatically adjusts position within its respective housing to intercept the respective laser plane 2,6 at its midpoint. The first and second sensing bodies 14,15 and the rotating or oscillating first and second lasers 1,5 are commercially available from a number of sources, including Spectra-physics Co.

Figure 3:
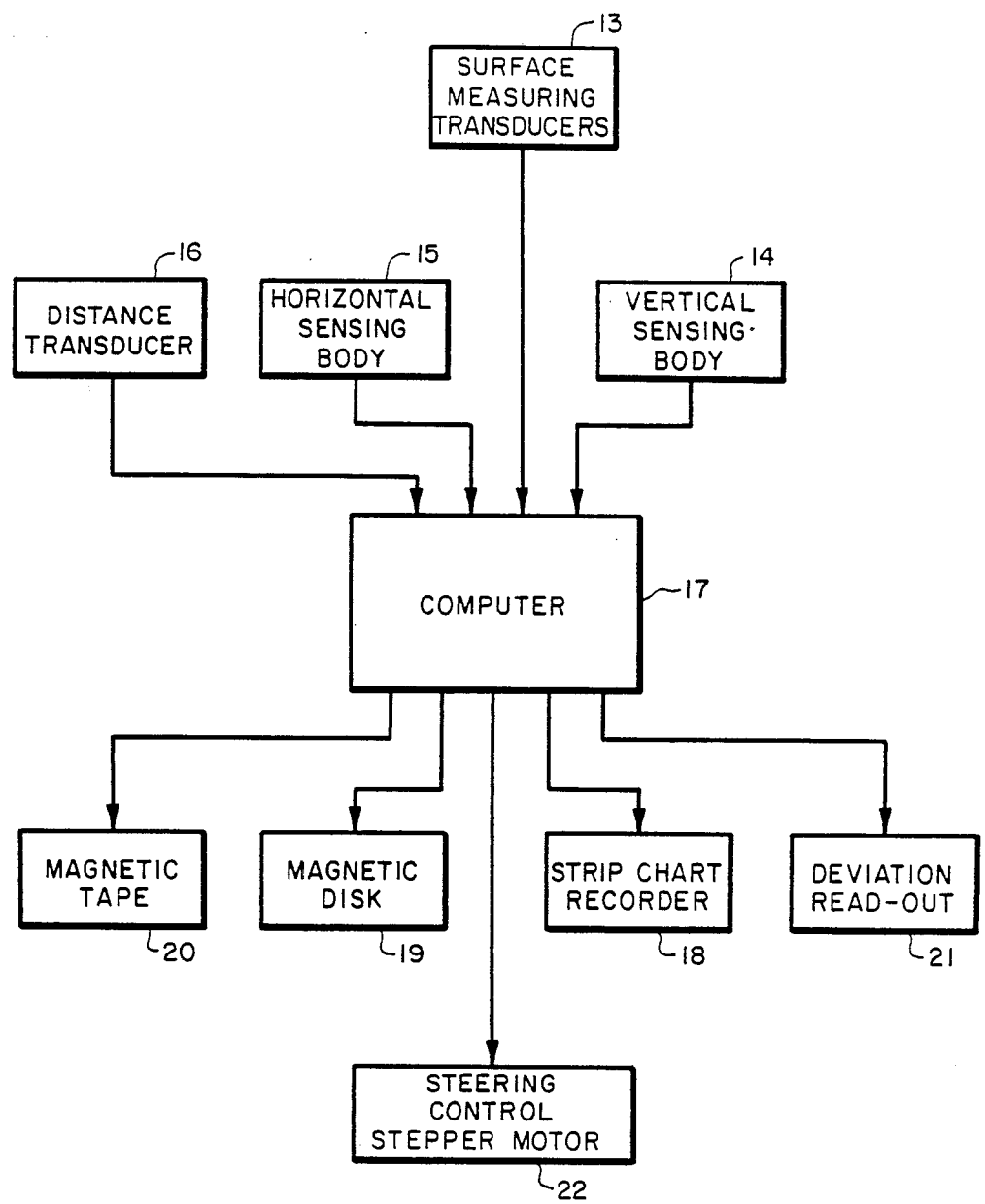
FIG. 3 is a block diagram illustrating the interconnections of the various elements of the presently preferred embodiment carried by the measuring vehicle.

As illustrated in FIG. 3, the vehicle 10 also carries a computer 17 or other conventional analog and/or digital signal processing equipment for processing the signals generated by the first and second sensing bodies 14, 15, and the surface measuring equipment 13 in any conventional manner. In addition, the vehicle 10 preferably carries conventional recording and storage equipment such as a conventional strip chart recorder 18 and magnetic disk or tape drives 19,20 for recording and storing the various signals. The availability, set-up, and operation of the equipment for processing, recording, and storing the various signals is well known to those skilled in the art and requires no further explanation here.

In addition, the vehicle 10 preferably carries a distance transducer 16 of any conventional type for generating signals corresponding to increments of distance travelled by the vehicle 10 along the surface 8. The distance transducer 16 may comprise a conventional light source and detector circuitry, for example, mounted on a wheel 11 of the vehicle 10, for generating pulses corresponding to revolutions of the wheel 11. As illustrated in FIG. 3, the distance values corresponding to the pulses generated by the distance transducer are also preferably processed by the computer 17, and recorded and stored on magnetic tape 20 or disk 19 as described.

Figure 2:
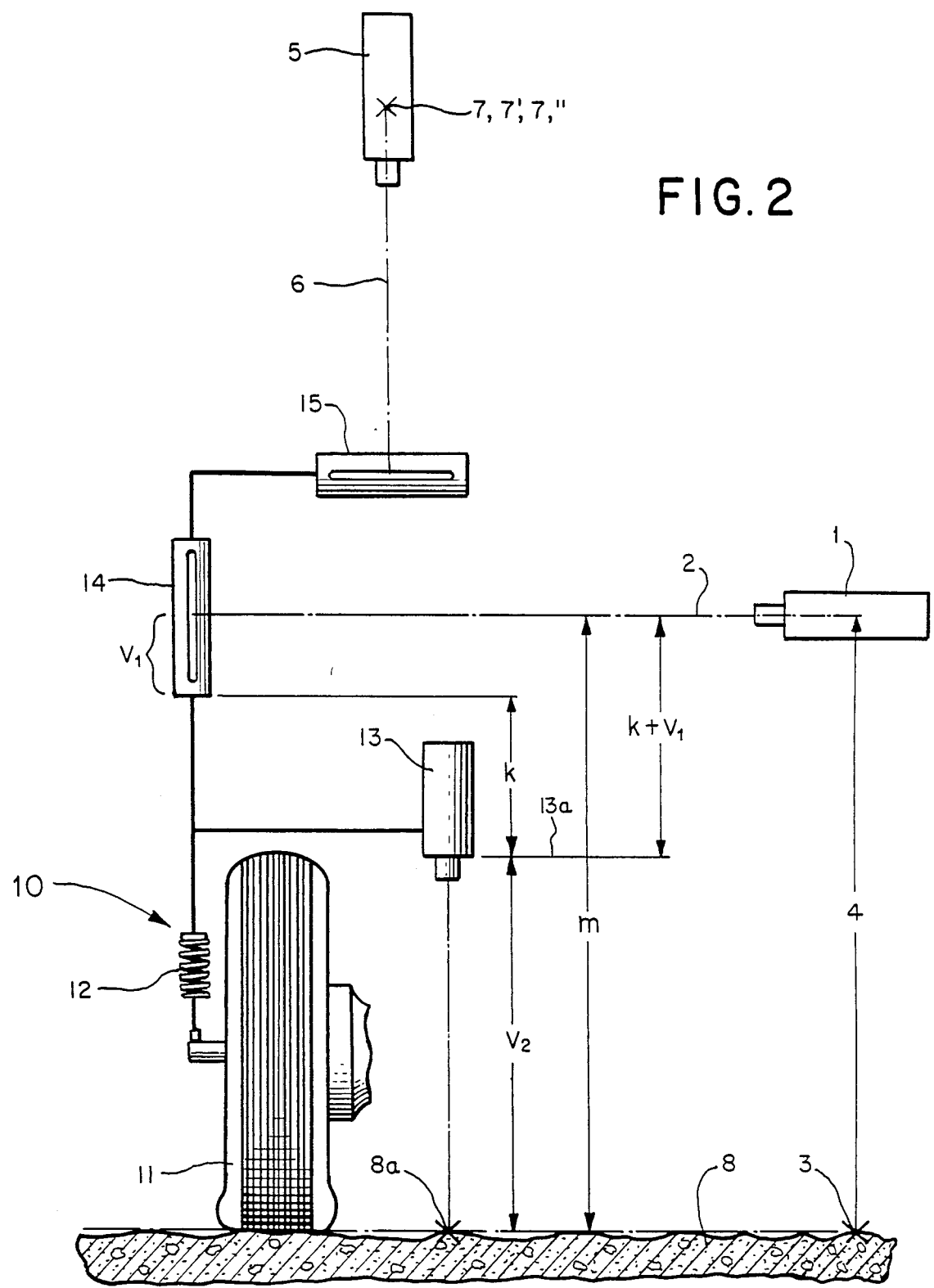
FIG. 2 is a block diagram of a presently preferred embodiment of the surface measuring system of the present invention.

Operation of the preferred embodiment of the present invention will now be described. As shown in FIGS. 1 and 2, the first sensing body 14 is mounted vertically on vehicle 10 with its lowest point at a known constant distance k above the measuring plane 13a of the surface measuring equipment 13. The laser plane 2 impinges on the first sensing body 14 at a certain elevation $V_1$ above its lowest point, and the first sensing body 14 generates signals corresponding to this elevation. Preferably the laser plane 2 is substantially horizontal. However, it may be at a known, fixed angle with respect to horizontal. In this case, the signals generated by the first sensing body 14 are compensated for the angular offset of the laser plane 2 in any conventional manner. The distance between the measuring plane 13a and a point of measurement 8a on the surface 8 is represented by the variable $V_2$. The distance between the lowest point on the first sensing body 14 and the point of measurement 8a on surface 8 is therefore represented by the expression $k+V_2$. The distance between the known, fixed reference established by laser plane 2 and the point of measurement 8a on surface 8 is represented by the variable m. The values m, k, $V_1$, and $V_2$ are related according to the following formula:

$$m = V_2 + k + V_1$$

As the vehicle 10 proceeds along surface 8, the wheels 11 encounter irregularities which cause compression and expansion of the springs 12 and consequently, variations in the vertical position of the chassis of vehicle 10. The resulting variations in $V_1$ are equal and opposite to the resulting variations in $V_2$. The computer 17 or other processing equipment described above preferably processes the signals generated by the first sensing body 14 and the surface measuring equipment 13 according to the stated formula. The value m thus obtained by the computer 17 is an accurate measure of the variations in the surface 8 at the measuring points 8a with respect to the reference established by the laser plane 2 continuously compensated for variations in the vertical position of the vehicle 10. The compensated values are recorded and stored for later use.

Alternatively, the computer 17 or other processing equipment can calculate the mean of the compensated value over a selected time or distance unit defined by transducer 16 or by a conventional digital clock, for example, and the mean value can be stored on magnetic disk 19 or tape 20 along with the means of the signals generated during the same period by the first and second sensing bodies 14, 15. In this manner, conservation of limited storage capacity is achieved.

Lateral deviations by the vehicle 10 from a selected measuring path are also preferably sensed, recorded and stored, and corrected. The substantially vertical laser plane 6 generated by the second laser 5 defines the measuring path to be followed by the vehicle 10 as it proceeds along surface 8. As vehicle 10 proceeds along the surface 8, the substantially vertical laser plane 6 impinges upon the second sensing body 15, which generates signals indicative of the point of incidence. Initially, a desired point of incidence is arbitrarily selected. It is preferable to select a point of incidence near the midpoint of the sensing body 15, since this provides the largest range of measurable lateral deviation in either direction. As the vehicle 10 proceeds along the surface 8, the computer 17 or other processing equipment on the vehicle 10 continuously compares the signals generated by the second sensing body 15 with a value corresponding to the selected point of incidence. Any deviations of the generated signal from the selected value indicates that the vehicle 10 has deviated from the selected measurement path. Referring to FIG. 3, any such deviations are preferably recorded and stored for later use. The path of vehicle 10 may then be corrected either automatically with a steering control mechanism which responds to signals generated computer 17 or other processing equipment, or manually by a driver monitoring a read-out 21. A suitable automatic steering control mechanism may comprise a conventional digitally programmable stepper motor 22, for example.

Subsequent measuring passes by the vehicle 10 over different portions of the surface 8 can be accomplished in a number of ways. If a single second laser 5 is employed, it can be repositioned transversely across the surface 8 on each pass of the vehicle 10 first to point 7', then to point 7" etc. as indicated in FIG. 2 to generate substantially vertical laser planes offset from and parallel to laser plane 6. Alternatively, assuming that the horizontal length of the second sensing body 15 is sufficient, the second laser camera 5 can remain in the same location as for a previous pass, and the desired point of incidence of the laser plane 6 on the second sensing body 15 can be adjusted accordingly. Still further, a plurality of second lasers 5 can be positioned at one or both ends of the surface 8 to be measured. This arrangement establishes a plurality of vertical reference planes 6 and eliminates the need to reposition the second laser 5 on subsequent measuring passes by the vehicle 10.

To enable subsequent measurements of substantially the same surface locations to be made at a later date, the position and elevation of the first laser 1, and the position of the second laser 5, are stored, together with the values generated by the first and second sensing bodies 14, 15, the surface measuring equipment 13, and the distance transducer 16 as the vehicle 10 proceeds along the surface 8. The stored values can then be used to guide a vehicle 10 along the same path it previously traveled via automatic control of the steering mechanism by a digitally programmable stepper motor 22 controlled by the computer 17 or other processing equipment as described above or manually by the driver monitoring a read-out 21, both as described previously. Any deviations by the vehicle 10 from the established measuring path can be recorded and stored as described above.

Of course it should be understood that the laser plane surface measuring apparatus described in detail herein is merely illustrative of various aspects of the present invention and is not intended to be limiting. Various changes and modifications to the preferred embodiment described herein will be apparent to those skilled in the art. Such changes and modifications can be made without departing from the spirit and scope of the present invention. It is, therefore, intended that such changes and modifications be covered by the following claims and their equivalents.

I claim:

1. A mobile system for measuring the characteristics of a traffic-bearing surface, comprising:
   first laser means at one or more known elevations fixed with respect to one or more known, fixed points for generating one or more first laser planes over said surface;

a vehicle for traveling along said surface, in the direction of measurement;

a plurality of surface measuring means mounted on said vehicle for measuring the vertical distance to said surface as said vehicle travels along said surface;

first sensing means for sensing the point of incidence of each of said one or more first laser planes therewith, and for generating signals corresponding to the elevations of said points of incidence, said first sensing means being mounted on said vehicle a known, constant distance above said surface measuring means; and processing means for processing said signals generated by said first sensing means and said surface measuring means to obtain values representative of the vertical elevation of said surface with respect to said one or more first laser planes, said values being compensated for variations in the vertical position of said vehicle as it proceeds along said surface.

2. The apparatus of claim 1 further comprising:

second laser means for generating one or more substantially vertical parallel second laser planes along said surface in the direction of measurement thereof;

second sensing means mounted on said vehicle for sensing the point of incidence of each of said one or more substantially vertical second laser planes therewith, and for generating signals corresponding to the locations of said points of incidence;

processing means for determining deviations of the signals generated by said second sensing means from a selected value corresponding to a selected point of incidence; and means responsive to said deviations for controlling the steering mechanism of said vehicle to guide the course of said vehicle along said surface.

3. The apparatus of claim 2 further comprising means for determining the distance travelled by said vehicle along said surface.

4. The apparatus of claim 3 further comprising means for recording and storing said signals generated by said first and second sensing means, and said compensated values representative of the vertical elevation of said surface, together with the corresponding values of the distance travelled by said vehicle along said surface.

5. The apparatus of claim 4 wherein said processing means comprises means for generating the mean values of each of the signals generated by said first and second sensing means, and said compensated values representative of the vertical elevation of said surface, and wherein said means for storing and recording comprises means to store said mean values together with the corresponding values of the distance travelled by said vehicle along said surface.

6. The apparatus of claim 1 wherein said one or more first laser planes are substantially horizontal with respect to said one or more known, fixed points.

7. A mobile system for measuring the characteristics of a traffic-bearing surface, comprising:

laser means for generating one or more substantially vertical laser planes along said surface in the direction of a measurement thereof;

a vehicle for traveling along said surface in the direction of said one or more substantially vertical laser planes;

a plurality of surface measuring means mounted on said vehicle for measuring the vertical distance to said surface as said vehicle travels along said surface;

sensing means mounted on said vehicle for sensing the point of incidence of each of said one or more substantially vertical laser planes therewith, and for generating signals corresponding to the locations of said points of incidence;

processing means for determining deviations of the signals generated by said sensing means from a selected value corresponding to a selected point of incidence; and means responsive to said deviations for controlling the steering mechanism of said vehicle to guide the course of said vehicle along said surface.

8. The apparatus of claim 7 further comprising means for determining the distance travelled by said vehicle along said surface.

9. The apparatus of claim 8 further comprising means for recording and storing said signals generated by said surface measuring means together with the corresponding values of said signals generated by said sensing means and the distance travelled by said vehicle along said surface.

10. The apparatus of claim 9 wherein said processing means comprises means for generating the mean values of each of the signals generated by said sensing means and said surface measuring means, and wherein said means for recording and storing comprises means to store said mean values together with the corresponding values of the distance traveled by said vehicle along said surface.

11. A mobile system for measuring the characteristics of a traffic-bearing surface, comprising:

first laser means positioned at a known elevation for generating a first substantially horizontal laser reference plane over a surface to be measured;

second laser means for generating a second substantially vertical laser reference plane along said surface;

a vehicle for traveling along said surface;

a plurality of surface measuring means mounted on said vehicle for measuring the vertical distance to said surface as said vehicle travels along said surface;

first sensing means mounted on said vehicle a selected distance above said surface measuring means for detecting the incidence of said first laser reference plane therewith and generating signals indicative of the elevation of the point of incidence;

second sensing means mounted on said vehicle for detecting the incidence of said second laser reference plane therewith and generating signals indicative of the point of incidence; and storage means for storing together corresponding values of said vertical distance and said points of incidence of said first and second laser reference planes so that said values of vertical distance are related to a fixed coordinate system.

12. The apparatus of claim 11 further comprising processing means for processing said measured values of vertical distance as a function of the elevation of the point of incidence of said first laser reference plane on said first sensing means to compensate the measured vertical distance values for deviations in the vertical position of said vehicle as it travels along said surface.

13. The apparatus of claim 11 further comprising:

processing means for determining deviations between said point of incidence of said second laser reference plane on said second sensing means and a selected point of incidence; and means responsive to said deviations for controlling the steering mechanism of said vehicle to guide the path of said vehicle.

14. The apparatus of claim 11 further comprising means for determining the distance traveled by said vehicle along said surface, and wherein said storage means comprises means for storing said distance along with said vertical distance and said points of incidence of said first and second laser reference planes so that said vertical distance values are related to a three dimensional coordinate system.

* * * * *